United States Patent [19]

Peehs et al.

[11] 4,259,155

[45] Mar. 31, 1981

[54] FUEL ASSEMBLY FOR GAS-COOLED NUCLEAR REACTORS

[75] Inventors: Martin Peehs, Bubenreuth; Manfred Hünner, Erlangen, both of Fed. Rep. of Germany

[73] Assignee: Kraftwerk Union Aktiengesellschaft, Mülheim, Fed. Rep. of Germany

[21] Appl. No.: 573,072

[22] Filed: Apr. 30, 1975

[30] Foreign Application Priority Data

May 15, 1974 [DE] Fed. Rep. of Germany ....... 2423501

[51] Int. Cl.³ .............................................. G21C 3/02
[52] U.S. Cl. ...................................... 176/78; 176/76
[58] Field of Search .......................... 176/76, 78, 81

[56] References Cited

U.S. PATENT DOCUMENTS

| | | | |
|---|---|---|---|
| 2,902,422 | 9/1959 | Hutter | 176/78 |
| 3,301,764 | 1/1967 | Timbs et al. | 176/76 X |
| 3,344,036 | 9/1967 | Haslam et al. | 176/81 X |
| 3,361,640 | 1/1968 | Hassig et al. | 176/81 X |
| 3,389,057 | 6/1968 | McGregor et al. | 176/78 X |

FOREIGN PATENT DOCUMENTS

| | | | |
|---|---|---|---|
| 1963139 | 6/1971 | Fed. Rep. of Germany | 176/81 |
| 2005760 | 8/1971 | Fed. Rep. of Germany | 176/81 |
| 2052342 | 5/1972 | Fed. Rep. of Germany | 176/81 |

*Primary Examiner*—Peter A. Nelson
*Attorney, Agent, or Firm*—Kenyon & Kenyon

[57] ABSTRACT

Fuel assemblies forming cores of gas-cooled reactors, operate at temperatures too high to permit the use of resilient contact elements for holding the fuel rods centered in the openings of the spacer grids of the fuel assemblies, solid and rigid contact elements not relying on resilience, being required. In such cases intercontacting surfaces of the fuel rod metal claddings and the spacer grid contact elements, are capable of sticking together, preventing relative sliding by these surfaces to accommodate thermally induced movements, resulting in the claddings being highly stressed. To prevent this, one or both of the intercontacting surfaces are roughened or otherwise processed to have peaks and valleys or depressions so that abrasion products are carried off between the peaks, permitting the intercontacting surfaces to remain relatively slidable with the result that the previously referred to stressing of the claddings is substantially reduced as compared to that resulting when there is surface sticking together.

3 Claims, 7 Drawing Figures

FUEL ASSEMBLY FOR GAS-COOLED NUCLEAR REACTORS

BACKGROUND OF THE INVENTION

Nuclear reactors conventionally comprise a pressure vessel containing a core formed from a large number of fuel assemblies, each assembly comprising top and bottom end pieces connected together by tubes, of which some may be used as control rod guide tubes, with a plurality of interspaced spacer grids mounted by the tubes between the end pieces. These spacer grids have a large number of openings through which metal clad fuel rods are inserted with the grids holding the fuel rods properly interspaced laterally and parallel to each other.

The spacer grid openings have larger cross sectional sizes than the fuel rods, and contact elements are used between the fuel rods and the spacer grid surfaces defining the openings in which the fuel rods are inserted. In the case of a pressurized-water reactor, the operating temperatures involved permit these contact elements to be designed as resilient elements and during thermal movements of the fuel rods relative the spacer grids, the intercontacting surfaces formed by the fuel rods and the elements remain relatively slidable so that the fuel rod metal claddings are not appreciably stressed, because the fuel rods can move relative to the spacer grids and the contact elements. However, in the case of gas-cooled nuclear reactors, core operating temperature are considerably higher than are involved by the operation of a pressurized-water reactor, the fuel rods and spacer grids being subjected to temperatures commonly ranging between 300° and 600° C. Resilient contact members are, of course, made of elastic or spring metal, and therefore, cannot remain capable of providing resilient fuel rod centering forces, at such higher temperature. Therefore, solid and rigid metal contact elements must be used to center the fuel rods in the openings formed by the spacer grids.

It has been found that with the fuel rod metal claddings and such solid and rigid metal contact elements forming rigidly fixed rubbing surfaces, the surfaces, instead of relatively sliding, tend to stick together. With the fuel rods unable to move relative to the spacer grids, the fuel rod claddings become highly stressed. This is undesirable because if a fuel rod cladding ruptures, the nuclear fuel is released.

It can be seen that in the case of gas-cooled reactors, a problem exists in connection with centering the fuel rods within the spacer grid fuel rod openings, without the fuel rod claddings becoming undesirably highly stressed during operation of the reactor.

SUMMARY OF THE INVENTION

The object of the present invention is to provide a solution to the above problem, without changing the basic or conventional design of the fuel assemblies and particularly the spacer grids and the rigid contact elements previously described.

It has been found possible to attain the above object by roughening one or both of the rubbing surfaces formed at the locations where the rigid metal contact elements and the fuel rod metal claddings press together to form the intercontacting surfaces which must rub on one another during thermally induced movements of the fuel rods relative to the spacer grids. The roughening should provide peaks and valleys or depressions between the peaks and into which abrasion products, such as the very small metal particles that result from the rubbing action, can enter. Such products, when thus carried off from the peaks of the roughened surface or surfaces, prevent the previously referred to sticking together of the surfaces. Apparently the presence of such abrasion products between smooth metal surfaces such as would be involved in the absence of any such roughening, are capable of actually welding the surfaces together under the operating temperatures existing in the case of a gas-cooled reactor core.

BRIEF DESCRIPTION OF THE DRAWINGS

The principles of the present invention are illustrated, to some extent schematically, by the accompanying drawings, in which.

DETAILED DESCRIPTION OF THE INVENTION

Figure 1:
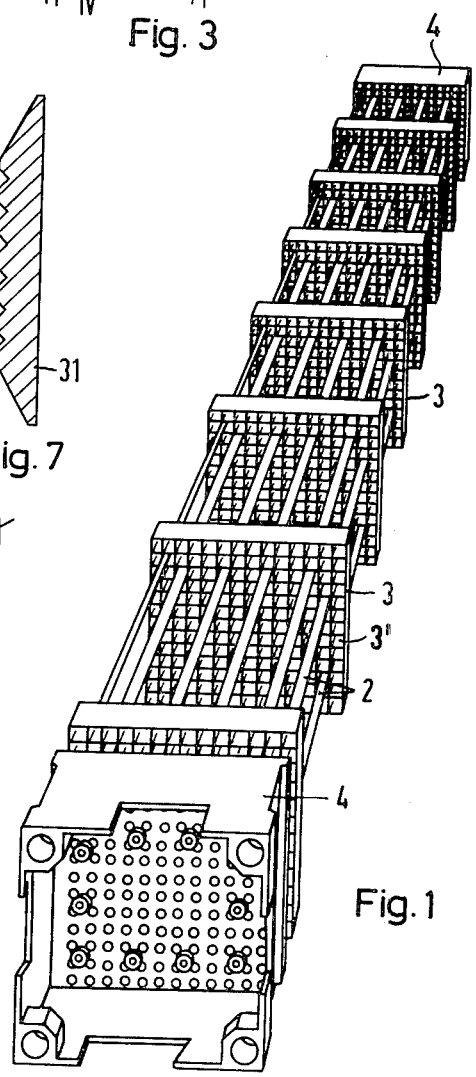
FIG. 1 is a perspective view of a typical fuel assembly supporting structure, with the fuel rods themselves removed to clarify the construction of such a structure.

In the above drawings, FIG. 1 is provided mainly to show the problem solved by the present invention. In this figure a fuel assembly supporting structure is shown as having the top and bottom end pieces 4 connected together in interspaced relationship by control rod guide tubes 2 and with a plurality of the interspaced fuel rod spacer grids 3 positioned between the end pieces and forming the openings 3' through which the fuel rods are to be inserted. The spacer grids form a pattern of these openings designed to interspace fuel rods inserted in the openings, in accordance with the nuclear physics involved by the particular reactor for which the ultimate fuel assembly is intended. The structure shown by FIG. 1 is generally of the type used by a pressurized-water reactor fuel assembly, but with the fuel rods inserted in the openings, the assembly could also be used in the case of a reactor involving the higher operating temperatures, and particularly in a gas-cooled reactor operating at temperatures within the range from about 300° to 600° C., for example.

It is to be appreciated that FIG. 1 is provided largely to show that in any reactor core fuel assembly, a plurality of interspaced fuel rod spacer grids are required to properly position the fuel rods in their mutually parallel and laterally interspaced relationship. In all modern reactors using metal clad fuel rods, comparable fuel assemblies are involved because the number of fuel rods required to form a core is so great that for manipulating convenience during refueling, for example, the fuel rods are integrated into assemblies involving the use of fuel rod spacer grids of one type or another. In all cases, the spacer grids have fuel rod openings or passages of substantially greater cross-sectional extent than that of the fuel rods themselves, therefore, requiring contact or supporting elements to maintain the fuel rods properly centered within the openings of these spacer grids.

Figure 5:
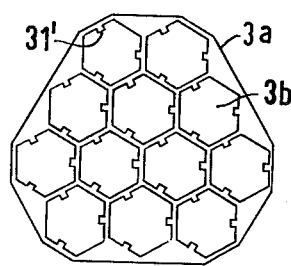
FIG. 5 is a plan view of a modified form of fuel rod spacer grid.

A possibly more common type of fuel assembly, as used in the case of gas-cooled reactors with which the present invention is concerned, comprises a tubular metal duct within which the fuel rod spacer grids are mounted, the configuration in that case generally being hexagonal in cross section, an example of such a spacer grid being shown by FIG. 5. However, regardless of the cross-sectional contour of the fuel assembly, when used in the core of a gas-cooled reactor, the fuel rod centering elements must be rigidly made of solid metal and effect rigid and solid contact with the metal clad fuel rods engaged by the elements, because the high operating temperatures prohibit the use of contact elements functionally relying on any kind of metal resilient, elastic or spring elements.

Figure 2:
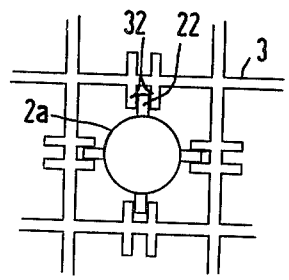
FIG. 2 is a cross section showing one recently developed form of rigid contact elements used to position the fuel rod in one of the spacer grid openings, when the operating temperature prohibit the use of resilient or spring elements.
Figure 3:
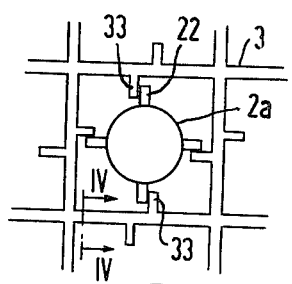
FIG. 3 is the same as FIG. 2 but shows a modified form of the rigid contact elements.

FIGS. 2 and 3 show the square meshes 3 of spacer grids of the type shown by FIG. 1, these grids forming the openings by criss-cross flat web members. In both figures, the metal claddings 2a of the fuel rods have radially projecting and axially extending fins 22 transversely engaged in FIG. 2 on both opposite sides by flanges 32 projecting inwardly from the surfaces of the grid 3 defining the fuel rod opening, while in FIG. 3 the grid 3 has flange 33 projecting inwardly and engaging only one side of the axially extending fins 22. In both cases, the flanges which extend inwardly from the spacer grid surfaces forming the fuel rod's opening, are designed to lock the fuel rod against both rotative and transverse motions, the locking action being effected by interengaging, rigidly positioned, metal elements having intercontacting surfaces which must rub on one another, possibly under substantial pressure in the circumferential direction of the fuel rod, when working under the operating conditions of a gas-cooled reactor.

Heretofore, due to conventional manufacturing practices, such rubbing metal surfaces have been smoothly finished. Furthermore, because it is desired that the fuel rods be able to freely move, both axially and radially, while thermally expanding and contracting, and relative to the spacer grids, normal engineering technology clearly suggested the use of smooth bearing surfaces rubbing on one another. However, as previously noted, in spite of such an assumption based on the prior art knowledge, in the case of a fuel assembly operating within the temperature ranges encountered in a case of a gas-cooled reactor, instead of sliding smoothly relative to each other, it has been found that the surfaces stick relative to each other, resulting in the spacer grids locking or partially locking, the metal clad fuel rods against movement in any direction relative to the spacer grids.

Incidentally, it is to be noted that as shown by FIGS. 2 and 3, the rigid, inflexible metal contact elements, although locking the fuel rods against transverse displacement, do permit the fuel rod metal claddings to thermally expand and contract both axially and radially, the fins 22 having free ends and being restrained only in directions transversely with respect to the fins or, in other words, circumferentially with respect to the fuel rods.

Figure 4:
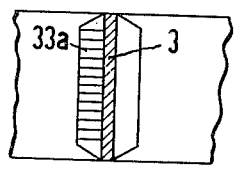
FIG. 4 is a cross section taken on the line IV—IV in FIG. 3.

FIG. 4 represents an attempt to in the best possible way illustrate the side surfaces of, in this instance, the projections 33 shown by FIGS. 2 and 3. As illustrated, the surfaces 33a of the projections 33 are roughened as by being grooved at right angles to the axial direction of the fuel rods.

In the case of FIG. 5, showing a spacer grid perhaps more typical of the fuel assembly of a gas-cooled reactor, the spacer grid 3a, in this case, provides solid inwardly extending projections or axially extending posts 31' having inner ends which directly in abutting relationship engage the cladding of the fuel rods, 2a, this metal cladding enclosing the nuclear fuel 25. With such a simple arrangement of rigid strutting or centering metal elements 31', radial expansion of the fuel rod results in very high rubbing pressures between the inner ends of the elements or posts 31' and the outsides of the metal cladding 2a, but at the same time, the fuel rods must move axially relative to the spacer grids having the elements 31'.

Figure 7:
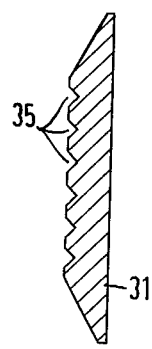
FIG. 7 is a cross section taken on the line VII—VII in FIG. 6.

With the above in mind, FIG. 7 in vertical cross section shows that the end face of each of the rigid metal parts 31', and which is the face engaging the metal cladding 2a of the fuel rod, is formed with transversely extending grooves 35. In the case of the spacer grid of FIG. 5, specially designed for use in the tubular gas duct of a gas-cooled reactor fuel assembly, a piece of solid metal is drilled to form the beginnings of the fuel rod openings 3b shown by FIG. 5, the inside diameters of the holes coinciding substantially with the outside diameters of the metal clad fuel rods involved, as exemplified by a diameter of about 9 mm, for example. Then by a screw threading machine, these holes are internally screw-threaded to form valleys having a depth of about 0.6 mm. Thereafter, by, for example, the spark-erosion process, the metal is worked off in such a manner that the hexagonal plate of FIG. 5 is produced, leaving the projections 31' of FIG. 6, now having their inner end faces screw-threaded as shown at 35 in FIG. 7.

Alternately, the roughening of the inner ends of the projections 31' might be effected also by the spark erosion technique. The method which is more advantageous depends on the design of the spacer grid involved as well as on its material, spacer grids normally being made of stainless steels, although other materials, exemplified by nickel and zirconium alloys, might also be used. The fuel rod claddings are normally tubes of corresponding materials, although the metal alloy of the cladding and that from which the spacer grids are made, need not be the same. The same kind of grooved surface can also be applied to the fins shown by FIGS. 2 and 3 which, in such cases, are normally soldered or welded to the normal cladding 2 of the fuel rods. In such cases, the surface roughening can be given to the surfaces of the fins 22 prior to their attachment to the fuel rod cladding tubes.

The principles of the present invention are particularly applicable in the case of the appropriate components of the fuel assemblies used in gas-cooled reactors which use helium, or possibly carbon dioxide, as the gas coolant. In general, the principles are applicable to any fuel rod assembly using metal clad fuel rods and spacer grids having fuel rod centering or contact elements, of course, also made of metal, which operate at temperatures high enough to introduce the problem of the fuel rod and spacer grid contact elements stocking together. It is assumed that such sticking phenomena is caused in the case of smooth, unroughened rubbing surfaces producing by abrasion, particles of fine particle size which, therefore, are capable of welding the parts together with the temperatures involved. With adequately roughened surfaces, these particles pass off from the tips or peaks of the roughening and into the valleys, preventing the interwelding action.

Particularly considering that the fuel rod assembly of all coolant reactor designs operate in vertical positions, the use of a roughening having the characteristics of screw threads, or in other words, which are made as helical cuts in one or both of the interrubbing parts, is of particular importance because the helical valleys thus formed provide paths down through which abrasion products, possibly in the form of very fine particles of metal, can pass gradually downwardly so as to work off from the bottom ends of the grooves or threads and fall free from the locations where they might otherwise cause undesired interwelding action.

Figure 6:
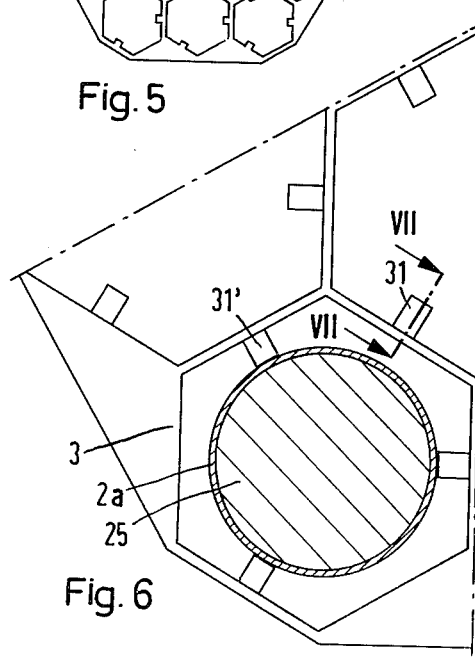
FIG. 6 on an enlarged scale shows a metal clad fuel rod supported in one of the openings of the spacer grid shown by FIG. 5, the fuel rod being shown in cross section.

In FIG. 6 the rod's cladding directly forms a metal surface contacted by the spacer grid elements; in FIGS. 2 and 3 the rod also forms metal surfaces, in this case via the fins secured to and, in effect, forming parts of the rod. In all cases the spacer elements contact a metal surface formed by the rod.

We claim:

1. A fuel assembly for gas-cooled nuclear reactors, comprising a plurality of fuel rods having metal cladding containing nuclear fuel, said cladding having outer metal surfaces, spacer grids having interspaced openings through which said rods are inserted and rigid elements extending from said grids and having metal surfaces contacting the rods' said surfaces, in each instance one of said surfaces being roughened.

2. The assembly of claim 1 in which said one of said surfaces is roughened by having threads cut in the surface.

3. The assembly of claim 1 in which said one of said surfaces has transversely extending grooves.

* * * * *